(12) United States Patent
Yang et al.

(10) Patent No.: US 11,431,765 B2
(45) Date of Patent: Aug. 30, 2022

(54) SESSION MIGRATION—BASED SCHEDULING METHOD AND SERVER

(71) Applicant: Huawei Technologies Co., Ltd., Shenzhen (CN)

(72) Inventors: Jinwen Yang, Nanjing (CN); Like Jiang, Nanjing (CN); Xiaojun Gu, Shenzhen (CN); Zhihang Lu, Nanjing (CN); Yang Cao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 4 days.

(21) Appl. No.: 16/545,227

(22) Filed: Aug. 20, 2019

(65) Prior Publication Data

US 2019/0379709 A1    Dec. 12, 2019

Related U.S. Application Data

(63) Continuation of application No. PCT/CN2018/076975, filed on Feb. 22, 2018.

(30) Foreign Application Priority Data

Feb. 23, 2017    (CN) .......................... 201710101630.1

(51) Int. Cl.
*H04L 29/06* (2006.01)
*H04L 65/1083* (2022.01)
(Continued)

(52) U.S. Cl.
CPC ........ *H04L 65/1083* (2013.01); *G06F 16/953* (2019.01); *H04L 61/2007* (2013.01); *H04L 69/16* (2013.01); *H04L 61/6022* (2013.01)

(58) Field of Classification Search
None
See application file for complete search history.

(56) References Cited

U.S. PATENT DOCUMENTS 9,094,464 B1 *   7/2015   Scharber ............. H04L 67/2814
9,130,970 B2     9/2015   Carney et al.
(Continued)

FOREIGN PATENT DOCUMENTS

CN    101557423 A    10/2009
CN    102932678 A    2/2013
(Continued)

OTHER PUBLICATIONS

Foreign Communication From a Counterpart Application, Chinese Application No. 201710101630.1, Chinese Office Action dated Jan. 22, 2020, 8 pages.
(Continued)

Primary Examiner — Natisha D Cox
(74) Attorney, Agent, or Firm — Conley Rose, P.C.

(57) ABSTRACT

A session migration-based scheduling method, where the method includes: receiving a service request from a terminal, where the service request is used to obtain target content required by the terminal; querying a target Internet Protocol (IP) address in a database based on the service request, where the target IP address is an IP address of a server in which the target content is located; determining the target IP address based on a candidate IP address fed back by the database; if the target IP address is different from an IP address of the first media server, determining, by the first media server, that the first media server is missing the target content; and sending the service request to a second media server, where an IP address of the second media server is the target IP address.

20 Claims, 8 Drawing Sheets

(51) Int. Cl.
*G06F 16/953* (2019.01)
*H04L 61/5007* (2022.01)
*H04L 69/16* (2022.01)
*H04L 101/622* (2022.01)

(56) References Cited

U.S. PATENT DOCUMENTS

| | | | | |
|---|---|---|---|---|
| 9,667,519 | B2* | 5/2017 | Zhao | H04L 45/04 |
| 2012/0089700 | A1 | 4/2012 | Safruti et al. | |
| 2014/0089584 | A1* | 3/2014 | Pan | G06F 3/061 |
| | | | | 711/E12.017 |
| 2014/0089594 | A1* | 3/2014 | Long | G06F 12/12 |
| | | | | 711/133 |
| 2014/0344414 | A1* | 11/2014 | Ozawa | H04L 69/329 |
| | | | | 709/219 |
| 2016/0043990 | A1 | 2/2016 | Kagan | |
| 2016/0119279 | A1* | 4/2016 | Maslak | H04L 67/1004 |
| | | | | 709/223 |
| 2018/0278680 | A1* | 9/2018 | Liu | H04L 67/1097 |
| 2020/0007616 | A1* | 1/2020 | Shattil | H04L 67/1021 |

FOREIGN PATENT DOCUMENTS

| | | | |
|---|---|---|---|
| CN | 103841142 A | | 6/2014 |
| CN | 103905526 A | | 7/2014 |
| CN | 104967590 A | | 10/2015 |
| CN | 104980416 A | | 10/2015 |
| CN | 105933399 A | | 9/2016 |
| KR | 20170103286 A | * | 9/2017 |

OTHER PUBLICATIONS

Machine Translation and Abstract of Chinese Publication No. CN101557423, Oct. 14, 2009, 12 pages.
Machine Translation and Abstract of Chinese Publication No. CN103905526, Jul. 2, 2014, 24 pages.
Machine Translation and Abstract of Chinese Publication No. CN104967590, Oct. 7, 2015, 24 pages.
Machine Translation and Abstract of Chinese Publication No. CN104980416, Oct. 14, 2015, 32 pages.
Machine Translation and Abstract of Chinese Publication No. CN105933399, Sep. 7, 2016, 14 pages.
Foreign Communication From a Counterpart Application, European Application No. 18757467.8, Extended European Search Report dated Dec. 9, 2019, 8 pages.
Foreign Communication From a Counterpart Application, PCT Application No. PCT/CN2018/076975, English Translation of International Search Report dated May 4, 2018, 2 pages.
Foreign Communication From a Counterpart Application, PCT Application No. PCT/CN2018/076975, English Translation of Written Opinion dated May 4, 2018, 4 pages.

* cited by examiner

SESSION MIGRATION—BASED SCHEDULING METHOD AND SERVER

CROSS-REFERENCE TO RELATED APPLICATIONS

This application is a continuation of International Patent Application No. PCT/CN2018/076975, filed on Feb. 22 2018, which claims priority to Chinese Patent Application No. 201710101630.1, filed on Feb. 23, 2017. The disclosures of the aforementioned applications are hereby incorporated by reference in their entireties.

TECHNICAL FIELD

This application relates to the field of communications technologies, and in particular, to a session migration-based scheduling method and a server.

BACKGROUND

With rapid development of computer and Internet technologies, users have increasingly high requirements on experience of communication services. When information is obtained from the Internet, a server being accessed needs to be capable of accurately and efficiently providing required content. In a service scenario of a content delivery network (CDN), there may be a large quantity of missed terminal requests on a media server (MS) if content scheduling is inaccurate. In this case, a server usually serves a terminal in a redirection or proxy mode. However, the two current implementation solutions have various disadvantages.

In other approaches, when the redirection mode is used for a service, as shown in FIG. 1.a, a terminal initiates a request to a first media server to obtain media content. After a first request of the terminal arrives at the first media server, the first media server returns a 302 address (namely, a link address of a second media server) to the terminal if the first media server misses the media content. The terminal automatically initiates a request to the new second media server. If the second media server has required content, the second media server sends the content to the terminal. If the second media server does not have the required content, the second media server returns another 302 address for redirection or returns a 404 address (indicating that the content does not exist, and communication ends). In the solution, there are many interactions between the terminal and the server, a delay is large, and perception of a same piece of media content by the terminal is transparent.

When the proxy mode is used for a service, as shown in FIG. 1.b, a terminal initiates a request to a first media server to obtain media content. If required content does not exist in the first media server locally, the first media server obtains the content from a second media server. The second media server locally hits the content, and sends the content to the first media server. Then the first media server forwards the received content to the terminal. In the solution, serviceable resources of the server need to be consumed, and overall performance of external services is degraded. When the redirection mode and the proxy mode are used for services at the same time, inherent disadvantages of a solution still cannot be overcome.

SUMMARY

Embodiments of this application provide a session migration-based scheduling method to reduce an information exchange between a server and a terminal and an information exchange between servers, and reduce a delay between the terminal and the server, in order to save server resources and improve service quality.

A first aspect of the embodiments of this application provides a session migration-based scheduling method. The method includes: receiving, by a first media server, a service request that is sent by a terminal and that is used to obtain target content required by the terminal, where the service request includes a destination address, the destination address is an address of the first media server, and the destination address includes a destination Internet Protocol (IP) address and a destination hardware medium access control (MAC) address; querying, by the first media server in a database based on the service request, an IP address of a server in which the target content is located, where the IP address of the server in which the target content is located is a target IP address; determining, by the first media server, the target IP address based on a candidate IP address fed back by the database; and if the target IP address is different from the destination IP address, determining, by the first media server, that the first media server misses the target content, and sending the service request to a second media server, where an IP address of the second media server is the target IP address. In this embodiment of this application, the service request of the terminal is sent to the second media server, such that an information exchange between the first media server and the terminal is reduced, thereby saving server resources and improving service quality.

With reference to the first aspect of the embodiments of this application, in a first implementation of the first aspect of the embodiments of this application, determining, by the first media server, the target IP address based on a candidate IP address fed back by the database includes: receiving, by the first media server, a candidate IP address fed back by the database, where the candidate IP address includes at least one IP address; and if the at least one candidate IP address includes the IP address of the first media server, determining, by the first media server, the IP address of the first media server as the target IP address; or if the at least one candidate IP address does not include the IP address of the first media server, determining, by the first media server, any one of the candidate IP address as the target IP address. In this embodiment of this application, a process in which the first media server determines the target IP address is detailed, and implementation and operability of this embodiment of this application are improved.

With reference to the first implementation of the first aspect of the embodiments of this application, in a second implementation of the first aspect of the embodiments of this application, after determining, by the first media server, the IP address of the first media server as the target IP address, the method further includes discarding, by the first media server, a candidate IP address that is not determined as the target IP address. In this embodiment of this application, a process of processing a candidate IP address that is not selected is clarified, such that steps of this embodiment of this application are more complete.

With reference to the first implementation of the first aspect of the embodiments of this application, in a third implementation of the first aspect of the embodiments of this application, after determining, by the first media server, any one of the candidate IP address as the target IP address, the method further includes discarding, by the first media server, a candidate IP address that is not determined as the target IP address. In this embodiment of this application, a process of processing a candidate IP address that is not selected is clarified, such that steps of this embodiment of this application are more complete.

With reference to the first aspect of the embodiments of this application, in a fourth implementation of the first aspect of the embodiments of this application, determining, by the first media server, that the first media server misses the target content, and sending the service request to a second media server includes: determining, by the first media server, that the first media server misses the target content; modifying, by the first media server, a destination MAC address of the service request to a MAC address of the second media server; and sending, by the first media server, the modified service request to the second media server. In this embodiment of this application, an operation process in which the first media server sends the service request is detailed, and implementation and operability of this embodiment of this application are improved.

With reference to the first aspect of the embodiments of this application, in a fifth implementation of the first aspect of the embodiments of this application, after determining, by the first media server, the target IP address based on a candidate IP address fed back by the database, the method further includes: if the target IP address is the same as the IP address of the first media server, determining, by the first media server, that the first media server hits the target content, and sending the target content to the terminal. In this embodiment of this application, an application scenario in which the first media server hits the target content is added, and an implementation of this embodiment of this application is increased, such that steps of this embodiment of this application are more complete.

A second aspect of the embodiments of this application provides a session migration-based scheduling method. The method includes: receiving, by a second media server, a service request sent by a first media server, where the service request is used to obtain target content required by a terminal, the service request includes a destination address, the destination address includes a destination IP address and a destination MAC address, and the destination address is an address of the second media server; querying, by the second media server, a target IP address in a database based on the service request, where the target IP address is an IP address of a server in which the target content is located; determining, by the second media server, the target IP address based on a candidate IP address fed back by the database; and if the target IP address is the same as an IP address of the second media server, determining, by the second media server, that the second media server hits the target content, and sending the target content to the terminal. In this embodiment of this application, the second media server receives the service request sent by the first media server, such that a delay between the terminal and the second media server is reduced, thereby saving server resources and improving service quality.

With reference to the second aspect of the embodiments of this application, in a first implementation of the second aspect of the embodiments of this application, receiving, by a second media server, a service request sent by a first media server includes: receiving, by the second media server, the service request sent by the first media server; and modifying, by the second media server, the destination IP address of the service request to the IP address of the second media server. In this embodiment of this application, an operation process in which the second media server receives the service request is detailed, and implementation and operability of this embodiment of this application are improved.

With reference to the second aspect of the embodiments of this application, in a second implementation of the second aspect of the embodiments of this application, determining, by the second media server, the target IP address based on a candidate IP address fed back by the database includes: receiving, by the second media server, at least one candidate IP address fed back by the database; and if the at least one candidate IP address includes the IP address of the second media server, determining, by the second media server, the IP address of the second media server as the target IP address; or if the at least one candidate IP address does not include the IP address of the second media server, determining, by the second media server, any one of the candidate IP address as the target IP address. In this embodiment of this application, a process in which the second media server determines the target IP address is detailed, and implementation and operability of this embodiment of this application are improved.

With reference to the second implementation of the second aspect of the embodiments of this application, in a third implementation of the second aspect of the embodiments of this application, after determining, by the second media server, the IP address of the second media server as the target IP address, the method further includes discarding, by the second media server, a candidate IP address that is not determined as the target IP address. In this embodiment of this application, a process of processing a candidate IP address that is not selected is clarified, such that steps of this embodiment of this application are more complete.

With reference to the second implementation of the second aspect of the embodiments of this application, in a fourth implementation of the second aspect of the embodiments of this application, after determining, by the second media server, any one of the candidate IP address as the target IP address, the method further includes discarding, by the second media server, a candidate IP address that is not determined as the target IP address. In this embodiment of this application, a process of processing a candidate IP address that is not selected is clarified, such that steps of this embodiment of this application are more complete.

With reference to the second aspect of the embodiments of this application, in a fifth implementation of the second aspect of the embodiments of this application, determining, by the second media server, that the second media server hits the target content, and sending the target content to the terminal includes: determining, by the second media server, that the second media server hits the target content; modifying, by the second media server, a source IP address of the target content to an IP address of the first media server, where the source IP address is used by the terminal to continue to communicate with the first media server; and sending, by the second media server, the modified target content to the terminal. In this embodiment of this application, a process of processing the target content after the second media server hits the target content is added, such that the terminal continues to communicate with the first media server, and this embodiment of this application is more logical.

A third aspect of the embodiments of this application provides a session migration-based scheduling method. The method includes: obtaining, by a terminal, an IP address of a first media server; sending, by the terminal, a service request to the first media server, where the service request is used to obtain target content required by the terminal; and receiving, by the terminal, the target content sent by a second media server. In this embodiment of this application, the service request of the terminal is sent to the first media server, and the target content sent by the second media server is received, such that an information exchange between a server and the terminal and an information exchange between the servers are reduced, thereby saving server resources and improving service quality.

With reference to the third aspect of the embodiments of this application, in a first implementation of the third aspect of the embodiments of this application, obtaining, by a terminal, an IP address of a first media server includes: querying, by the terminal, an IP address corresponding to a domain name of a media server in a scheduling server; and receiving, by the terminal, the IP address that is of the first media server and that is fed back by the scheduling server. In this embodiment of this application, a process of obtaining the IP address of the first media server is clarified, and implementation and completeness of this embodiment of this application are improved.

With reference to the third aspect of the embodiments of this application, in a second implementation of the third aspect of the embodiments of this application, after sending, by the terminal, a service request to the first media server, the method further includes receiving, by the terminal, the target content sent by the first media server. In this embodiment of this application, a process in which the terminal receives the target content is provided, such that steps of this embodiment of this application are more complete.

A fourth aspect of the embodiments of this application provides a server, where the server is a first media server. The first media server includes: a receiving unit configured to receive a service request sent by a terminal, where the service request is used to obtain target content required by the terminal, the service request includes a destination address, the destination address includes a destination IP address and a destination MAC address, and the destination address is an address of the first media server; a query unit configured to query a target IP address in a database based on the service request, where the target IP address is an IP address of a server in which the target content is located; a first processing unit configured to determine the target IP address based on a candidate IP address fed back by the database; and a second processing unit configured such that if the target IP address is different from an IP address of the first media server, the second processing unit determines that the first media server misses the target content, and send the service request to a second media server, where an IP address of the second media server is the target IP address. In this embodiment of this application, the service request of the terminal is sent to the second media server, such that an information exchange between the first media server and the terminal is reduced, thereby saving server resources and improving service quality.

With reference to the fourth aspect of the embodiments of this application, in a first implementation of the fourth aspect of the embodiments of this application, the first processing unit includes: a receiving subunit configured to receive at least one candidate IP address fed back by the database; a first determining subunit configured such that if the at least one candidate IP address includes the IP address of the first media server, the first determining subunit determines the IP address of the first media server as the target IP address; and a second determining subunit configured such that if the at least one candidate IP address does not include the IP address of the first media server, the second determining subunit determines any one of the candidate IP address as the target IP address. In this embodiment of this application, a process in which the first media server determines the target IP address is detailed, and implementation and operability of this embodiment of this application are improved.

With reference to the first implementation of the fourth aspect of the embodiments of this application, in a second implementation of the fourth aspect of the embodiments of this application, the first processing unit further includes a first discarding subunit configured to discard a candidate IP address that is not determined as the target IP address. In this embodiment of this application, a process of processing a candidate IP address that is not selected is clarified, such that steps of this embodiment of this application are more complete.

With reference to the first implementation of the fourth aspect of the embodiments of this application, in a third implementation of the fourth aspect of the embodiments of this application, the first processing unit further includes a second discarding subunit configured to discard a candidate IP address that is not determined as the target IP address. In this embodiment of this application, a process of processing a candidate IP address that is not selected is clarified, such that steps of this embodiment of this application are more complete.

With reference to the fourth aspect of the embodiments of this application, in a fourth implementation of the fourth aspect of the embodiments of this application, the second processing unit includes: a third determining subunit configured to determine that the first media server misses the target content; a modification subunit configured to modify a destination MAC address of the service request to a MAC address of the second media server; and a sending subunit configured to send the modified service request to the second media server. In this embodiment of this application, an operation process in which the first media server sends the service request is detailed, and implementation and operability of this embodiment of this application are improved.

With reference to the fourth aspect of the embodiments of this application, in a fifth implementation of the fourth aspect of the embodiments of this application, the server further includes a third processing unit. The third processing unit is configured such that if the target IP address is the same as the IP address of the first media server, the third processing unit determines that the first media server hits the target content, and send the target content to the terminal. In this embodiment of this application, an application scenario in which the first media server hits the target content is added, and an implementation of this embodiment of this application is increased, such that steps of this embodiment of this application are more complete.

A fifth aspect of the embodiments of this application provides a server, where the server is a second media server. The second media server includes: a receiving unit configured to receive a service request sent by a first media server, where the service request is used to obtain target content required by a terminal, the service request includes a destination address, the destination address includes a destination IP address and a destination MAC address, and the destination address is an address of the second media server; a query unit configured to query a target IP address in a database based on the service request, where the target IP address is an IP address of a server in which the target content is located; a first processing unit configured to determine the target IP address based on a candidate IP address fed back by the database; and a second processing unit configured such that if the target IP address is the same as an IP address of the second media server, the second processing unit determines that the second media server hits the target content, and send the target content to the terminal.

In this embodiment of this application, the second media server receives the service request sent by the first media server, such that a delay between the terminal and the second media server is reduced, thereby saving server resources and improving service quality.

With reference to the fifth aspect of the embodiments of this application, in a first implementation of the fifth aspect of the embodiments of this application, the receiving unit includes: a first receiving subunit configured to receive the service request sent by the first media server; and a first modification subunit configured to modify the destination IP address of the service request to the IP address of the second media server. In this embodiment of this application, an operation process in which the second media server receives the service request is detailed, and implementation and operability of this embodiment of this application are improved.

With reference to the fifth aspect of the embodiments of this application, in a second implementation of the fifth aspect of the embodiments of this application, the first processing unit includes: a second receiving subunit configured to receive at least one candidate IP address fed back by the database; a first determining subunit configured such that if the at least one candidate IP address includes the IP address of the second media server, the first determining subunit determines the IP address of the second media server as the target IP address; and a second determining subunit configured such that if the at least one candidate IP address does not include the IP address of the second media server, the second determining subunit determines any one of the candidate IP address as the target IP address. In this embodiment of this application, a process in which the second media server determines the target IP address is detailed, and implementation and operability of this embodiment of this application are improved.

With reference to the second implementation of the fifth aspect of the embodiments of this application, in a third implementation of the fifth aspect of the embodiments of this application, the first processing unit further includes a first discarding subunit configured to discard a candidate IP address that is not determined as the target IP address. In this embodiment of this application, a process of processing a candidate IP address that is not selected is clarified, such that steps of this embodiment of this application are more complete.

With reference to the second implementation of the fifth aspect of the embodiments of this application, in a fourth implementation of the fifth aspect of the embodiments of this application, the first processing unit further includes a second discarding subunit configured to discard a candidate IP address that is not determined as the target IP address. In this embodiment of this application, a process of processing a candidate IP address that is not selected is clarified, such that steps of this embodiment of this application are more complete.

With reference to the fifth aspect of the embodiments of this application, in a fifth implementation of the fifth aspect of the embodiments of this application, the second processing unit includes: a third determining subunit configured to determine that the second media server hits the target content; a second modification subunit configured to modify a source IP address of the target content to an IP address of the first media server, where the source IP address is used by the terminal to continue to communicate with the first media server; and a sending subunit configured to send the modified target content to the terminal. In this embodiment of this application, a process of processing the target content after the second media server hits the target content is added, such that the terminal continues to communicate with the first media server, and this embodiment of this application is more logical.

A sixth aspect of the embodiments of this application provides a terminal. The terminal includes: an obtaining unit configured to obtain an IP address of a first media server; a sending unit configured to send a service request to the first media server, where the service request is used to obtain target content required by the terminal; and a first receiving unit configured to receive the target content sent by a second media server. In this embodiment of this application, the service request of the terminal is sent to the first media server, and the target content sent by the second media server is received, such that an information exchange between a server and the terminal and an information exchange between the servers are reduced, thereby saving server resources and improving service quality.

With reference to the sixth aspect of the embodiments of this application, in a first implementation of the sixth aspect of the embodiments of this application, the obtaining unit includes: a query subunit configured to query an IP address corresponding to a domain name of a media server in a scheduling server; and a receiving subunit configured to receive the IP address that is of the first media server and that is fed back by the scheduling server. In this embodiment of this application, a process of obtaining the IP address of the first media server is clarified, and implementation and completeness of this embodiment of this application are improved.

With reference to the sixth aspect of the embodiments of this application, in a second implementation of the sixth aspect of the embodiments of this application, the terminal further includes a second receiving unit configured to receive the target content sent by the first media server. In this embodiment of this application, a process in which the terminal receives the target content is provided, such that steps of this embodiment of this application are more complete.

A seventh aspect of the embodiments of this application provides a computer-readable storage medium, where the computer-readable storage medium stores an instruction, and when the instruction is run on a computer, the computer performs the method according to the foregoing aspects.

An eighth aspect of the embodiments of this application provides a computer program product including an instruction, where when the computer program product is run on a computer, the computer performs the method according to the foregoing aspects.

It can be learned from the foregoing technical solutions that, the embodiments of this application have the following advantages.

In the technical solutions provided in the embodiments of this application, the first media server receives the service request sent by the terminal, where the service request is used to obtain the target content required by the terminal, the service request includes the destination address, the destination address includes the destination internet protocol IP address and the destination hardware MAC address, and the destination address is the address of the first media server; the first media server queries the target IP address in the database based on the service request, where the target IP address is the IP address of the server in which the target content is located; the first media server determines the target IP address based on the candidate IP address fed back by the database; and if the target IP address is different from the IP address of the first media server, the first media server determines that the first media server misses the target content, and sends the service request to the second media server, where the IP address of the second media server is the target IP address. In this way, an information exchange between the first media server and the terminal and an information exchange between the first media server and the second media server are reduced, and a delay between the terminal and the second media server is reduced, thereby saving server resources and improving service quality.

DESCRIPTION OF EMBODIMENTS

Embodiments of this application provide a session migration-based scheduling method to reduce an information exchange between a server and a terminal and an information exchange between servers, and reduce a delay between the terminal and the server, in order to save server resources and improve service quality.

To make persons skilled in the art understand the solutions in this application better, the following describes the embodiments of this application with reference to the accompanying drawings in the embodiments of this application.

In the specification, claims, and accompanying drawings of this application, terms "first", "second", "third", "fourth", and so on (if existent) are intended to distinguish between similar objects but do not necessarily indicate a specific order or sequence. It should be understood that the data termed in such a way is interchangeable in proper circumstances such that the embodiments described herein can be implemented in other orders than the order illustrated or described herein. Moreover, terms "include", "have" and any other variants are intended to cover a non-exclusive inclusion, for example, a process, method, system, product, or device that includes a list of steps or units is not necessarily limited to those steps or units that are expressly listed, but may include other steps or units not expressly listed or inherent to such a process, method, product, or device.

Figure 1A:
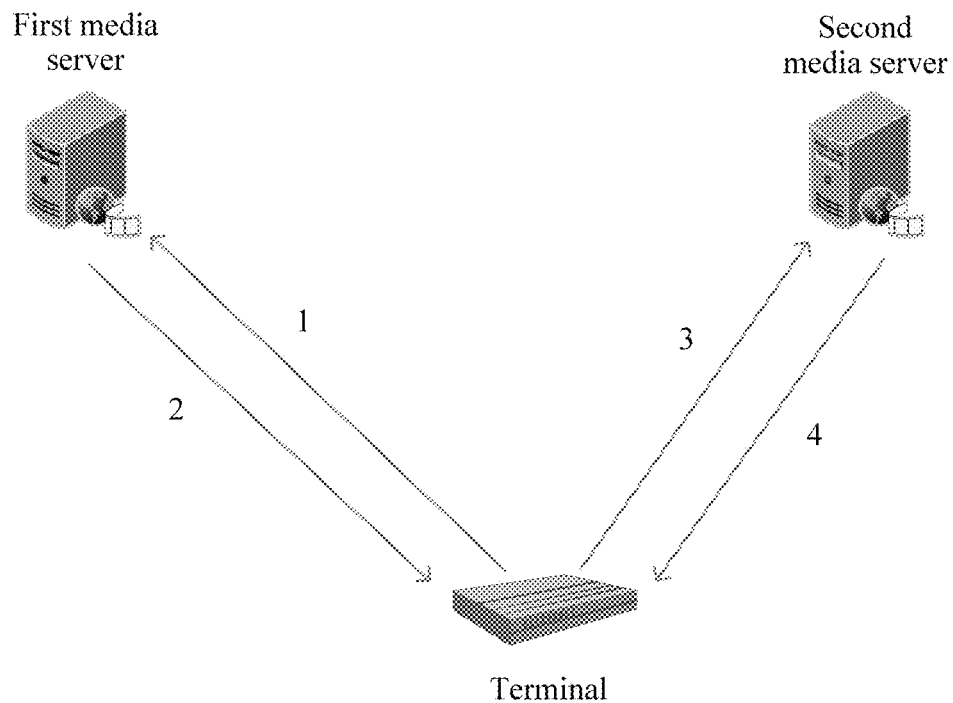
FIG. 1A is a schematic diagram of a process of interaction between a server and a terminal in a redirection mode.
Figure 1B:
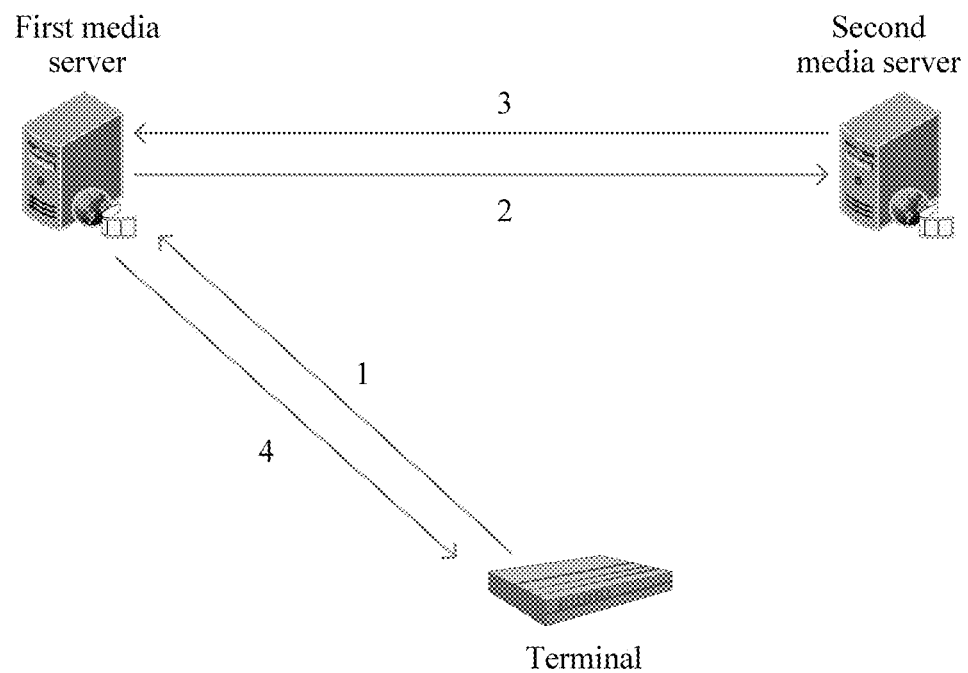
FIG. 1B is a schematic diagram of a process of interaction between a server and a terminal in a proxy mode.
Figure 2A:
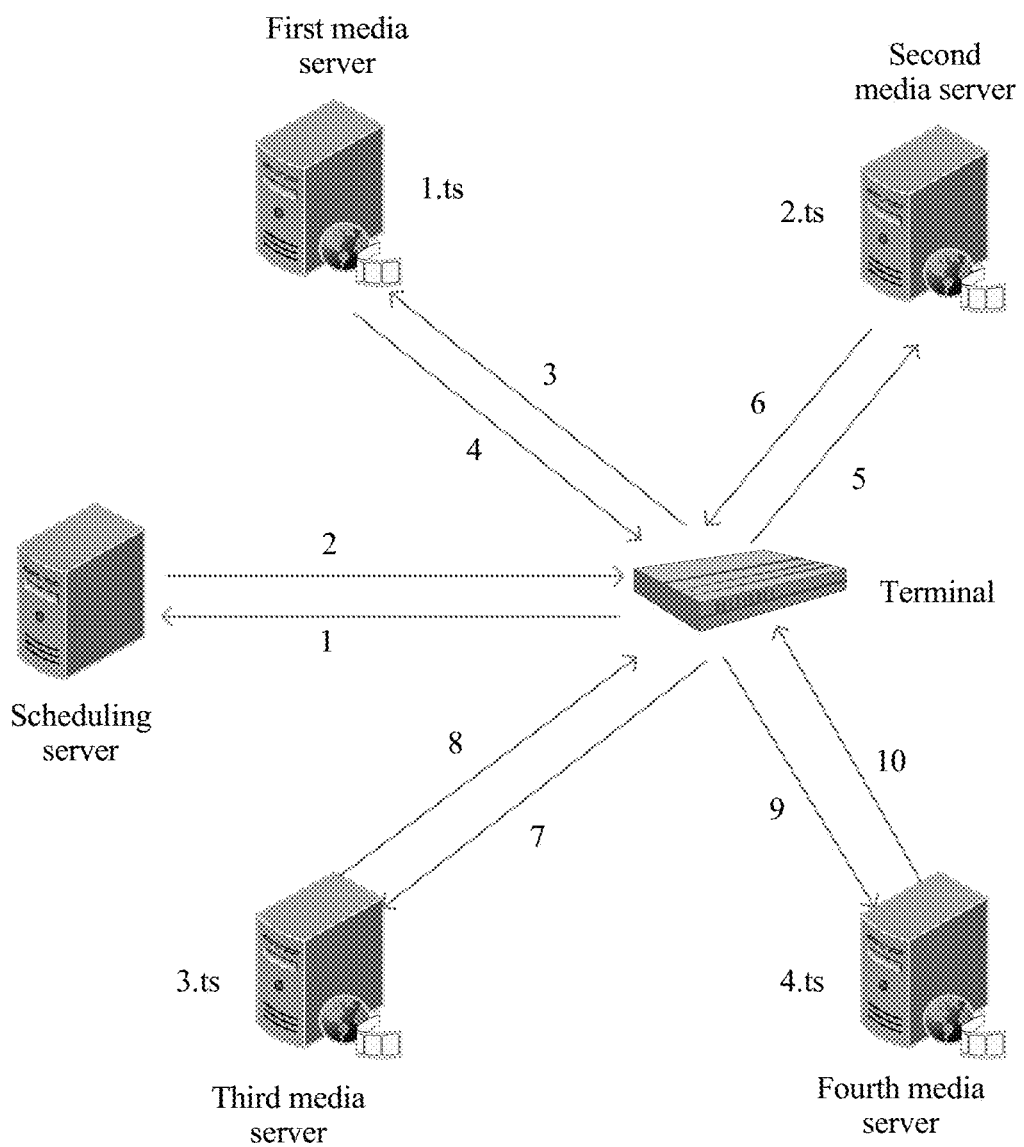
FIG. 2A is a schematic diagram of a system architecture according to an embodiment of this application.
Figure 2B:
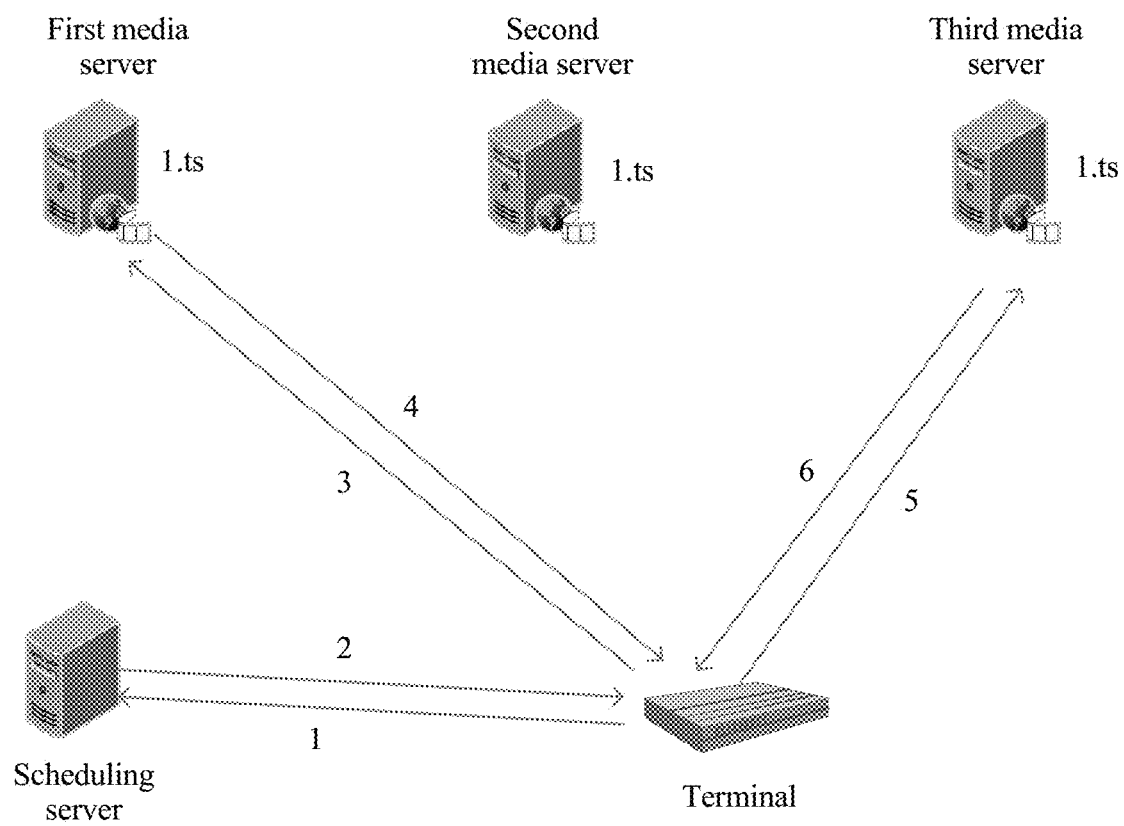
FIG. 2B is another schematic diagram of a system architecture according to an embodiment of this application.

The embodiments of this application may be applied to network architectures shown in FIG. 2A and FIG. 2B. In the network architecture shown in FIG. 2A, segments are stored in different servers in a distributed manner. One piece of media content includes several small segment files 1.ts, 2.ts, 3.ts, 4.ts, and the like, and these small segment files are stored in different servers in a distributed manner. In this case, if a terminal intends to request a piece of content, in an existing solution, the terminal needs to interact with a plurality of servers, as shown in step 3 to step 10 in FIG. 2A. In the network architecture shown in FIG. 2B, in a scenario in which a plurality of media servers have same segment content, media segment data of a server is lost for some reasons (for example, a bad sector of a magnetic disk, and a flawed or non-operation). When the content requested by the terminal is incomplete on a first media server, a service needs to be provided for the terminal in a redirection or proxy mode. For example, refer to step 3 to step 6 (using redirection as an example).

Figure 3:
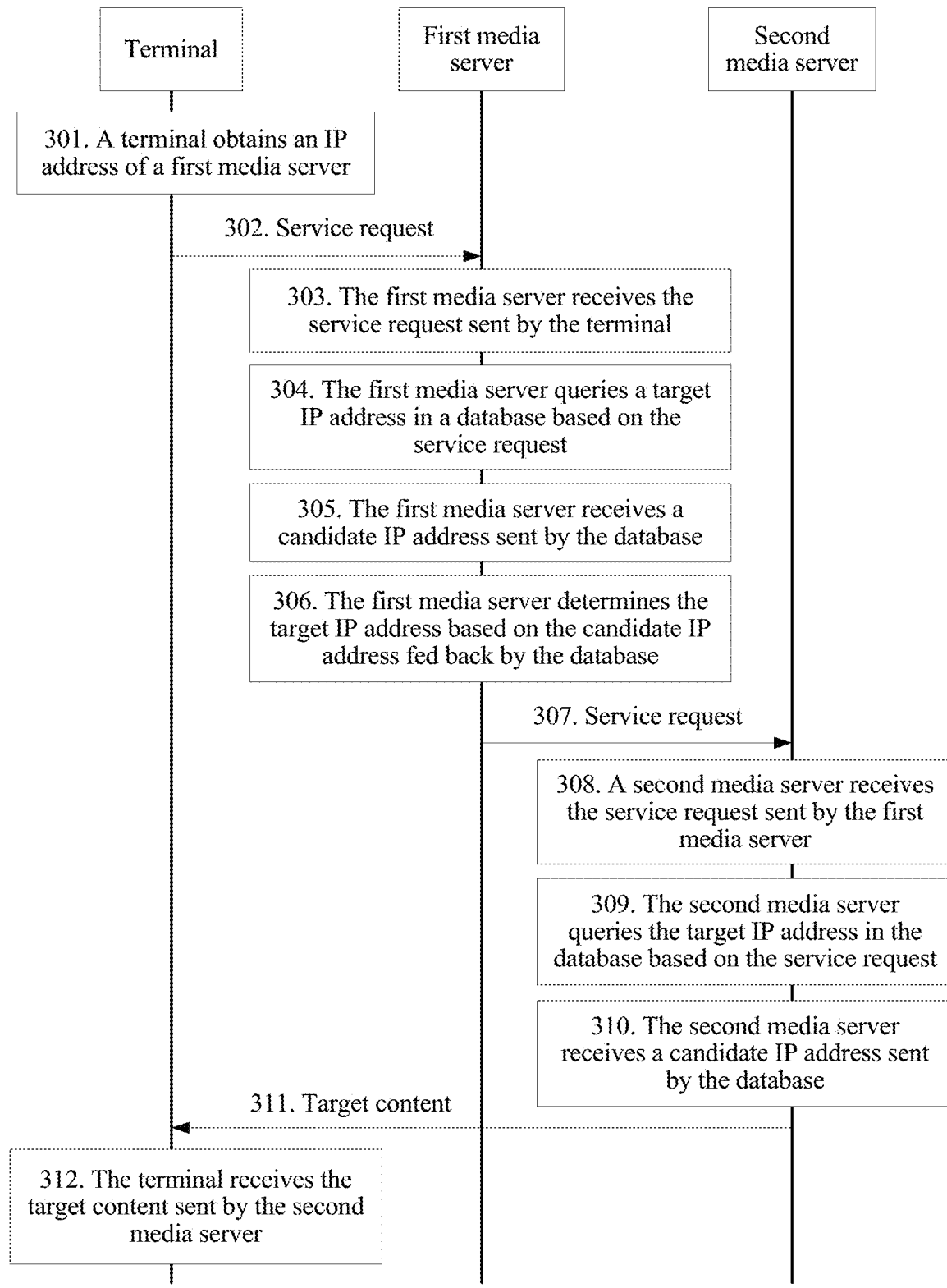
FIG. 3 is a schematic diagram of an embodiment of a session migration-based scheduling method according to an embodiment of this application.

For ease of understanding, the following describes a procedure of an embodiment of this application. Referring to FIG. 3, when content required by a terminal is stored in a plurality of media servers using segments, an embodiment of a session migration-based scheduling method in this embodiment of this application includes the following steps.

301. The terminal obtains an IP address of a first media server.

The terminal queries a domain name of a media server in a scheduling server. The scheduling server randomly selects a media server based on the domain name input by the terminal, and sends an IP address of the media server to the terminal. A domain name is a symbolized address solution developed based on an IP address. Each domain name corresponds to a specific IP address. The domain name is formed by well-known symbols, such as letters, digits, characters, or words in a particular manner.

It should be noted that, the IP address is a digital identifier, and this does not conform to daily use habits of people. Therefore, the IP address is difficult to remember and write during use. When searching for a resource, people usually enter a domain name. To ensure uniqueness of an IP address of each computer on a network, a user needs to apply for registration with a specific organization, and the organization assigns an IP address based on a network size and a development plan of a unit of the user. The IP address is represented using binary numbers. Each IP address has a length of 32 bits and includes four numbers less than 256, and the numbers are separated by dots. For example, in this embodiment of this application, an IP address of the scheduling server is 10.0.0.100, and an IP address of the terminal is 10.0.0.99. Alternatively, the IP addresses of the scheduling server and the terminal may be other values. This is not specifically limited herein.

It may be understood that, one IP address may correspond to a plurality of domain names, and one domain name may also correspond to a plurality of IP addresses. The scheduling server receives a destination domain name input by the terminal. The scheduling server queries a corresponding IP address based on the destination domain name. When there are a plurality of IP addresses corresponding to the destination domain name, the scheduling server randomly selects one IP address, and feeds back the IP address to the terminal. For example, the scheduling server randomly selects the IP address of the first media server based on the destination domain name, and returns the IP address to the terminal. In this embodiment of this application, the IP address of the first media server is 10.0.0.101.

302. The terminal sends a service request to the first media server.

The terminal sends the service request to the first media server. The service request is used to obtain target content required by the terminal. The service request carries an Identifier (ID) of the target content. Each ID uniquely corresponds to one piece of target content. For example, in this embodiment of this application, the ID of the target content required by the terminal is A1.ts. The ID may be in another form, for example, B1.ts or C1.ts. This is not specifically limited herein.

It should be noted that, in addition to the ID of the requested target content, the service request further includes a destination address. The destination address is used to access a target server. For example, in this embodiment of this application, the destination address of the service request sent by the terminal to the first media server is an address of the first media server.

303. The first media server receives the service request sent by the terminal.

The first media server receives the service request sent by the terminal. The service request is used to obtain the target content required by the terminal.

304. The first media server queries a target IP address in a database based on the service request.

The first media server obtains the ID of the target content from the service request, and sends a query request carrying the ID to the database, to query the target IP address. The target IP address is an IP address of a server in which the target content required by the terminal is located. For example, the first media server obtains the ID A1.ts of the target content from the service request, and sends a query request to the database. The query request carries the IDA1.ts of the target content, to query a target IP address corresponding to A1.ts.

It should be noted that, there is a mapping relationship between the target content and the IP address of the server storing the target content, and the mapping relationship is stored in the database. After the database receives the query request of the first media server, the mapping relationship between the target content and the IP address of the server storing the target content is searched for the corresponding IP address of the server based on the ID that is of the required target content and that is included in the service request.

It may be understood that, there may be one or more candidate IP addresses in the database that correspond to the IP address corresponding to the ID. In this embodiment of this application, the ID corresponds to at least one candidate IP address.

305. The first media server receives a candidate IP address sent by the database.

After a candidate IP address corresponding to the target content is found and the database sends the candidate IP address to the first media server, the first media server receives the candidate IP address sent by the database.

306. The first media server determines the target IP address based on the candidate IP address fed back by the database.

The first media server receives at least one candidate IP address fed back by the database. If the at least one candidate IP address includes the IP address of the first media server, the first media server determines the IP address of the first media server as the target IP address. If the at least one candidate IP address does not include the IP address of the first media server, the first media server determines any one of the candidate IP address as the target IP address.

It should be noted that, in this embodiment of this application, when it is found that a server in which A1.ts is located corresponds to three candidate IP addresses, and the candidate IP addresses do not include the IP address of the first media server, the database sends the three candidate IP addresses 10.0.0.102, 10.0.0.150, and 10.0.0.151 of the server in which A1.ts is located to the first media server. The first media server randomly selects one candidate IP address as the target IP address. In this embodiment of this application, 10.0.0.102 is determined as the target IP address. The IP address 10.0.0.102 is an IP address of a second media server.

When it is found that the server in which A1.ts is located corresponds to three candidate IP addresses, and the candidate IP addresses include the IP address of the first media server, the database sends the three candidate IP addresses 10.0.0.101, 10.0.0.150, and 10.0.0.151 of the server in which A1.ts of the target content is located to the first media server. Because the candidate IP addresses include the IP address 10.0.0.101 of the first media server, the first media server determines 10.0.0.101 as the target IP address.

It may be understood that, after determining the target IP address, the first media server may delete the other candidate IP addresses that are not selected, and reserve only the target IP address. The first media server may alternatively achieve a similar effect in another manner. For example, the first media server may shield the other candidate IP addresses that are not selected. This is not specifically limited herein.

307. If the target IP address is different from the IP address of the first media server, the first media server determines that the first media server misses target content, and sends the service request to a second media server, where an IP address of the second media server is the target IP address.

If the target IP address is different from the IP address of the first media server, the first media server determines that the target content does not exist locally, determines that the first media server misses the target content, and sends the service request to the second media server corresponding to the target IP address.

It should be noted that, the first media server includes a session migration module, and sends the service request to the second media server using the session migration module. Before sending the service request, the session migration module modifies the service request, and modifies a destination MAC address of the service request from a MAC address of the first media server to a MAC address of the second media server.

It may be understood that, if the target IP address is the same as the IP address of the first media server, the first media server determines that the first media server hits the target content, and sends the target content to the terminal.

308. The second media server receives the service request sent by the first media server.

The second media server receives the service request sent by the first media server. The service request is used to obtain the target content required by the terminal.

It should be noted that, in this embodiment of this application, after receiving the service request, the second media server modifies a destination IP address (namely, the IP address 10.0.0.101 of the first media server) of the service request to the IP address (10.0.0.102) of the second media server. After the modification is completed, the second media server considers that the service request is sent by the terminal to the second media server, in other words, the service request is valid.

It may be understood that, in this embodiment of this application, the session migration module of the first media server modifies the destination MAC address of the service request, and a session migration module of the second media server modifies the destination IP address of the service request. Alternatively, the session migration module of the first media server may modify both the destination IP address and the destination MAC address. This may be selected based on an actual situation and is not specifically limited herein.

309. The second media server queries the target IP address in the database based on the service request.

The second media server obtains the ID of the target content from the service request, and sends a query request carrying the ID to the database, to query the target IP address. The target IP address is the IP address of the server in which the target content required by the terminal is located. For example, the second media server obtains the ID A1.ts of the target content from the service request, and sends a query request to the database. The query request carries the ID A1.ts of the target content, to query a target IP address corresponding to A1.ts.

It should be noted that, there is the mapping relationship between the target content and the IP address of the server storing the target content, and the mapping relationship is stored in the database. After the database receives the query request of the second media server, the mapping relationship between the target content and the IP address of the server storing the target content is searched for the corresponding IP address of the server based on the ID that is of the required target content and that is included in the service request.

It may be understood that, there may be one or more candidate IP addresses in the database that correspond to the IP address corresponding to the ID. In this embodiment of this application, the ID corresponds to at least one candidate IP address.

310. The second media server receives a candidate IP address sent by the database.

The second media server receives at least one candidate IP address fed back by the database. If the at least one candidate IP address includes the IP address of the second media server, the second media server determines the IP address of the second media server as the target IP address. If the at least one candidate IP address does not include the IP address of the second media server, the second media server determines any one of the candidate IP address as the target IP address. If there is a mapping relationship in the second media server, the database preferably determines the IP address of the second media server as a candidate IP address.

It should be noted that, in this embodiment of this application, when it is found that the server in which A1.ts is located corresponds to three candidate IP addresses, and the candidate IP addresses include the IP address of the second media server, the database sends the three candidate IP addresses 10.0.0.102, 10.0.0.155, and 10.0.0.156 of the server in which A1.ts of the target content is located to the second media server. Because the candidate IP addresses include the IP address 10.0.0.102 of the second media server, the second media server determines 10.0.0.102 as the target IP address.

When it is found that the server in which A1.ts is located corresponds to three candidate IP addresses, and the candidate IP addresses do not include the IP address of the second media server, the database sends the three candidate IP addresses 10.0.0.103, 10.0.0.155, and 10.0.0.156 of the server in which A1.ts is located to the second media server. The second media server randomly selects one candidate IP address as the target IP address. In this embodiment of this application, 10.0.0.103 is determined as the target IP address. The IP address 10.0.0.103 is an IP address of a third media server.

It may be understood that, after determining the target IP address, the second media server may delete the other candidate IP addresses that are not selected, and reserve only the target IP address. The second media server may alternatively achieve a similar effect in another manner. For example, the second media server may shield the other candidate IP addresses that are not selected. This is not specifically limited herein.

311. If the target IP address is the same as the IP address of the second media server, the second media server determines that the second media server hits the target content, and sends the target content to the terminal.

If the target IP address is the same as the IP address of the second media server, the second media server determines that the second media server hits the target content. The second media server modifies a source IP address of the target content to the IP address of the first media server, where the source IP address is used by the terminal to continue to communicate with the first media server. The second media server sends the modified target content to the terminal.

It should be noted that, when the target content required by the terminal includes a plurality of pieces of segment content, and these pieces of segment content are stored in different servers in a distributed manner, for example, the target content required by the terminal includes A1.ts, A2.ts, and A3.ts, if the terminal continues to request required A2.ts and A3.ts from the first media server after the terminal obtains A1.ts, step 302 to step 311 are repeated. In this case, A2.ts may not be stored in the second media server. Instead, A2.ts may be stored in a third media server or another media server. However, from a perspective of the terminal, all content data is sent by the first media server, until the terminal obtains complete target content.

312. The terminal receives the target content sent by the second media server.

The terminal receives the target content sent by the second media server. The source IP address of the target content is the IP address of the first media server. The terminal determines, based on the source IP address of the target content, that the target content is sent by the first media server, and continues to request other content from the first media server.

In this embodiment of this application, the first media server receives the service request that is sent by the terminal and that is used to obtain the target content, determines that the required content does not exist in the first media server, and sends the service request to the second media server storing the target content. The second media server sends the content required by the terminal to the terminal. In this embodiment of this application, an information exchange between the first media server and the terminal and an information exchange between the first media server and the second media server are reduced, and a delay between the terminal and the second media server is reduced, thereby saving server resources and improving service quality.

Figure 4:
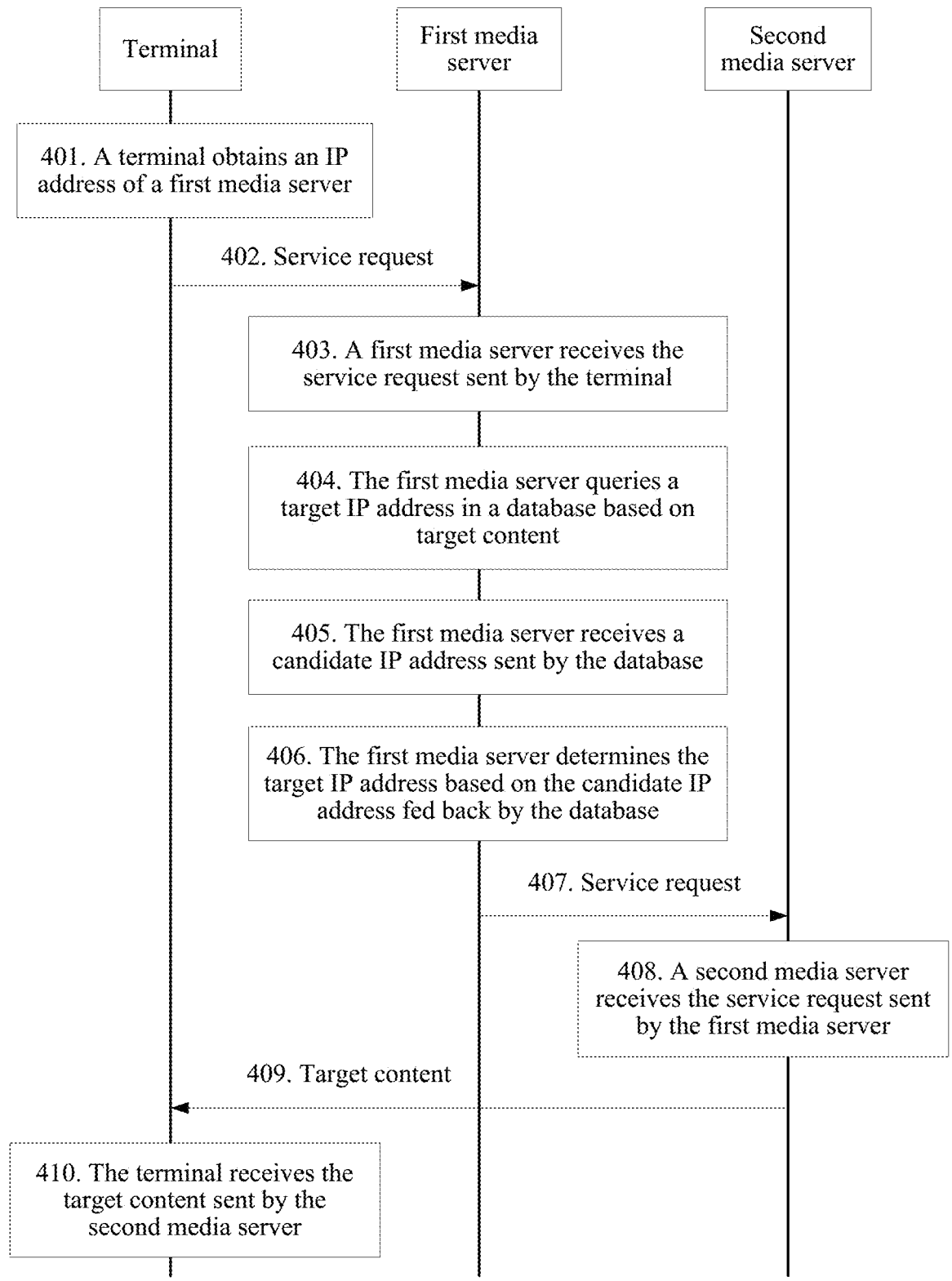
FIG. 4 is a schematic diagram of another embodiment of a session migration-based scheduling method according to an embodiment of this application.

For ease of understanding, the following describes a procedure of an embodiment of this application. Referring to FIG. 4, when content required by a terminal is stored in a plurality of media servers, another embodiment of a session migration-based scheduling method in this embodiment of this application includes the following steps.

401. The terminal obtains an IP address of a first media server.

The terminal queries a domain name of a media server in a scheduling server. The scheduling server randomly selects a media server based on the domain name input by the terminal, and sends an IP address of the media server to the terminal. A domain name is a symbolized address solution developed based on an IP address. Each domain name corresponds to a specific IP address. The domain name is formed by well-known symbols, such as letters, digits, characters, or words in a particular manner.

It should be noted that, the IP address is a digital identifier, and this does not conform to daily use habits of people. Therefore, the IP address is difficult to remember and write during use. When searching for a resource, people usually enter a domain name. To ensure uniqueness of an IP address of each computer on a network, a user needs to apply for registration with a specific organization, and the organization assigns an IP address based on a network size and a development plan of a unit of the user. The IP address is represented using binary numbers. Each IP address has a length of 32 bits and includes four numbers less than 256, and the numbers are separated by dots. For example, in this embodiment of this application, an IP address of the scheduling server is 10.0.0.100, and an IP address of the terminal is 10.0.0.99. Alternatively, the IP addresses of the scheduling server and the terminal may be other values. This is not specifically limited herein.

It may be understood that, one IP address may correspond to a plurality of domain names, and one domain name may also correspond to a plurality of IP addresses. The scheduling server receives a destination domain name input by the terminal. The scheduling server queries a corresponding IP address based on the destination domain name. When there are a plurality of IP addresses corresponding to the destination domain name, the scheduling server randomly selects one IP address, and feeds back the IP address to the terminal. For example, the scheduling server randomly selects the IP address of the first media server based on the destination domain name, and returns the IP address to the terminal. In this embodiment of this application, the IP address of the first media server is 10.0.0.101.

402. The terminal sends a service request to the first media server.

The terminal sends the service request to the first media server. The service request is used to obtain target content required by the terminal. The service request carries an ID of the target content. Each ID uniquely corresponds to one piece of target content. For example, in this embodiment of this application, the ID of the target content required by the terminal is A1.ts. The ID may be in another form, for example, B1.ts or C1.ts. This is not specifically limited herein.

It should be noted that, in addition to the ID of the requested target content, the service request further includes a destination address. The destination address is used to access a target server. For example, in this embodiment of this application, the destination address of the service request sent by the terminal to the first media server is an address of the first media server.

403. The first media server receives the service request sent by the terminal.

The first media server receives the service request sent by the terminal. The service request is used to obtain the target content required by the terminal.

404. If target content does not exist or target content is incomplete in a database of the first media server, the first media server queries a target IP address in the database based on the target content.

The first media server obtains the ID of the target content from the service request, and sends a query request carrying the ID to the database, to query the target IP address. The target IP address is an IP address of a server in which the target content required by the terminal is located. In this embodiment of this application, the first media server obtains the ID A1.ts of the target content from the service request, and sends a query request to the database. The query request carries the ID A1.ts of the target content, to query a target IP address corresponding to A1.ts.

It should be noted that, there is a mapping relationship between the target content and the IP address of the server storing the target content, and the mapping relationship is stored in the database. After the database receives the query request of the first media server, the mapping relationship between the target content and the IP address of the server storing the target content is searched for the corresponding IP address of the server based on the ID that is of the required target content and that is included in the service request.

It may be understood that, there may be one or more candidate IP addresses in the database that correspond to the IP address corresponding to the ID. In this embodiment of this application, the ID corresponds to at least one candidate IP address.

405. The first media server receives a candidate IP address sent by the database.

After a candidate IP address corresponding to the target content is found and the database sends the candidate IP address to the first media server, the first media server receives the candidate IP address sent by the database.

406. The first media server determines the target IP address based on the candidate IP address fed back by the database.

The first media server receives at least one candidate IP address fed back by the database. If the at least one candidate IP address includes the IP address of the first media server, the first media server determines any candidate IP address different from the IP address of the first media server as the target IP address. If the at least one candidate IP address does not include the IP address of the first media server, the first media server determines any one of the candidate IP address as the target IP address.

It should be noted that, in this embodiment of this application, when it is found that a server in which A1.ts is located corresponds to three candidate IP addresses, and the candidate IP addresses do not include the IP address of the first media server, the database sends the three candidate IP addresses 10.0.0.102, 10.0.0.150, and 10.0.0.151 of the server in which A1.ts is located to the first media server. The first media server randomly selects one candidate IP address as the target IP address. In this embodiment of this application, 10.0.0.102 is determined as the target IP address. The IP address 10.0.0.102 is an IP address of a second media server.

When it is found that the server in which A1.ts is located corresponds to three candidate IP addresses, and the candidate IP addresses include the IP address of the first media server, the database sends the three candidate IP addresses 10.0.0.101, 10.0.0.102, and 10.0.0.151 of the server in which A1.ts of the target content is located to the first media server. Because the candidate IP addresses include the IP address 10.0.0.101 of the first media server, the first media server determines 10.0.0.102 as the target IP address.

It may be understood that, after determining the target IP address, the first media server may delete the other candidate IP addresses that are not selected, and reserve only the target IP address. The first media server may alternatively achieve a similar effect in another manner. For example, the first media server may shield the other candidate IP addresses that are not selected. This is not specifically limited herein.

407. The first media server sends the service request to a second media server, where an IP address of the second media server is the target IP address.

After determining that the target content does not exist locally or the target content is incomplete, and determining that the first media server misses the target content, the first media server sends the service request to the second media server corresponding to the target IP address.

It should be noted that, the first media server includes a session migration module, and sends the service request to the second media server using the session migration module. Before sending the service request, the session migration module modifies the service request, and modifies a destination MAC address of the service request from a MAC address of the first media server to a MAC address of the second media server.

It may be understood that, if the target IP address is the same as the IP address of the first media server, the first media server determines that the first media server hits the target content, and sends the target content to the terminal.

408. The second media server receives the service request sent by the first media server.

The second media server receives the service request sent by the first media server. The service request is used to obtain the target content required by the terminal.

It should be noted that, in this embodiment of this application, after receiving the service request, the second media server modifies a destination IP address (namely, the IP address 10.0.0.101 of the first media server) of the service request to the IP address (10.0.0.102) of the second media server. After the modification is completed, the second media server considers that the service request is sent by the terminal to the second media server, in other words, the service request is valid.

It may be understood that, in this embodiment of this application, the session migration module of the first media server modifies the destination MAC address of the service request, and a session migration module of the second media server modifies the destination IP address of the service request. Alternatively, the session migration module of the first media server may modify both the destination IP address and the destination MAC address. This may be selected based on an actual situation and is not specifically limited herein.

409. The second media server determines that the second media server hits the target content, and sends the target content to the terminal.

The second media server determines that the second media server hits the target content. The second media server modifies a source IP address of the target content to the IP address of the first media server, where the source IP address is used by the terminal to continue to communicate with the first media server. The second media server sends the modified target content to the terminal.

410. The terminal receives the target content sent by the second media server.

The terminal receives the target content sent by the second media server. The source IP address of the target content is the IP address of the first media server. The terminal determines, based on the source IP address of the target content, that the target content is sent by the first media server, and continues to request other content from the first media server.

In this embodiment of this application, the first media server receives the service request that is sent by the terminal and that is used to obtain the target content, determines that the required content does not exist in the first media server, and sends the service request to the second media server storing the target content. The second media server sends the content required by the terminal to the terminal. In this embodiment of this application, an information exchange between the first media server and the terminal and an information exchange between the first media server and the second media server are reduced, and a delay between the terminal and the second media server is reduced, thereby saving server resources, and improving service quality.

Figure 5:
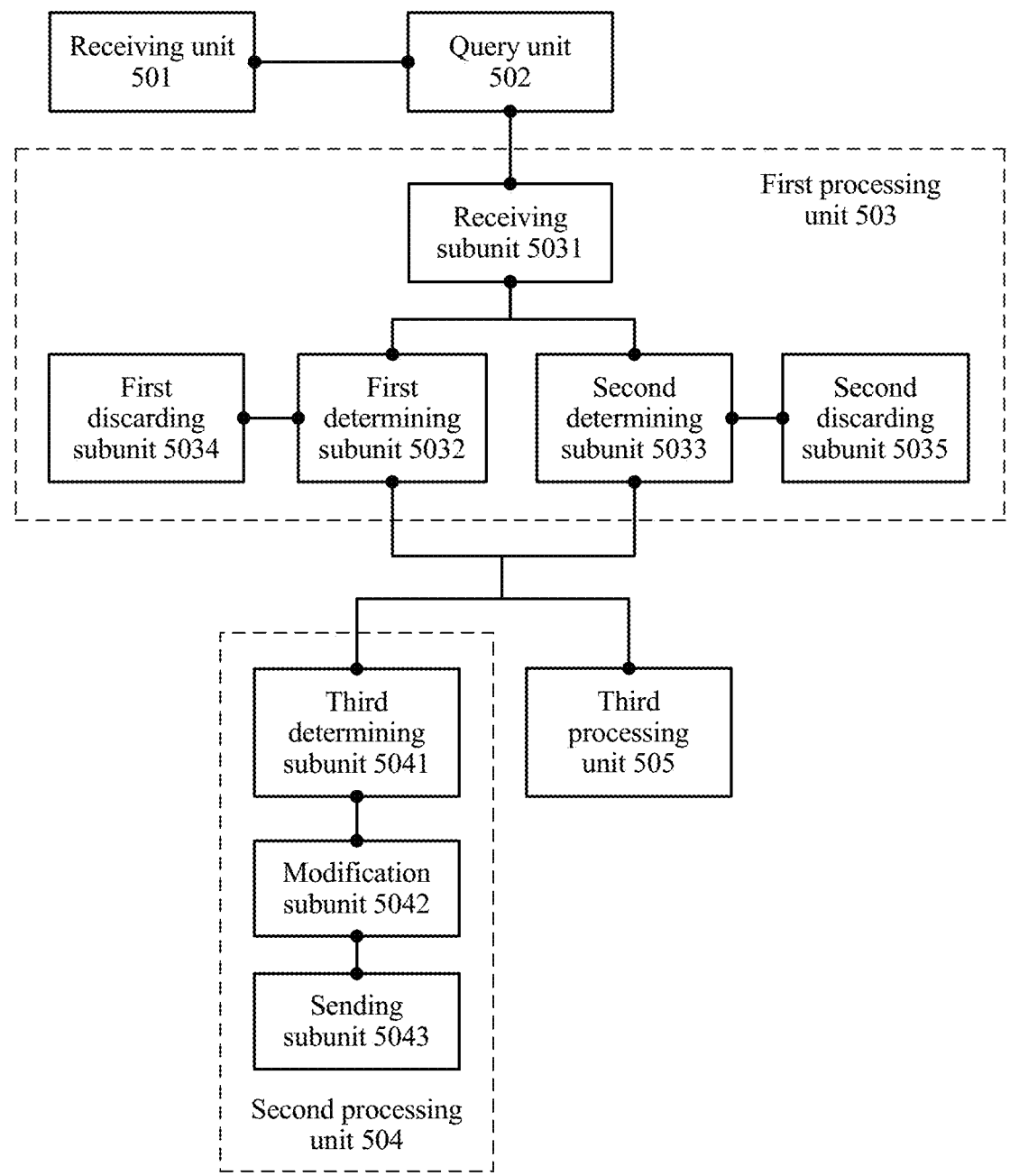
FIG. 5 is a schematic diagram of an embodiment of a first media server according to an embodiment of this application.

The foregoing describes the session migration-based scheduling method in the embodiments of this application. The following describes a server in an embodiment of this application. Referring to FIG. 5, an embodiment of a first media server in this embodiment of this application includes: a receiving unit 501 configured to receive a service request sent by a terminal, where the service request is used to obtain target content required by the terminal, the service request includes a destination address, the destination address includes a destination IP address and a destination MAC address, and the destination address is an address of the first media server; a query unit 502 configured to query a target IP address in a database based on the service request, where the target IP address is an IP address of a server in which the target content is located; a first processing unit 503 configured to determine the target IP address based on a candidate IP address fed back by the database; and a second processing unit 504 configured to: if the target IP address is different from an IP address of the first media server, determine that the first media server misses the target content, and send the service request to a second media server, where an IP address of the second media server is the target IP address.

Optionally, the first processing unit 503 may include: a receiving subunit 5031 configured to receive at least one candidate IP address fed back by the database; a first determining subunit 5032 configured to: if the at least one candidate IP address includes the IP address of the first media server, determine the IP address of the first media server as the target IP address; and a second determining subunit 5033 configured to: if the at least one candidate IP address does not include the IP address of the first media server, determine any one of the candidate IP address as the target IP address.

Optionally, the first processing unit 503 may further include a first discarding subunit 5034 configured to discard a candidate IP address that is not determined as the target IP address.

Optionally, the first processing unit 503 may further include a second discarding subunit 5035 configured to discard a candidate IP address that is not determined as the target IP address.

Optionally, the second processing unit 504 may further include: a third determining subunit 5041 configured to determine that the first media server misses the target content; a modification subunit 5042 configured to modify a destination MAC address of the service request to a MAC address of the second media server; and a sending subunit 5043 configured to send the modified service request to the second media server.

Optionally, the server may further include a third processing unit 505 configured such that if the target IP address is the same as the IP address of the first media server, the third processing unit 505 determines that the first media server hits the target content, and send the target content to the terminal.

In this embodiment of this application, the first media server sends the service request of the terminal to the second media server, such that an information exchange between the first media server and the terminal is reduced, thereby saving server resources, and improving service quality.

Figure 6:
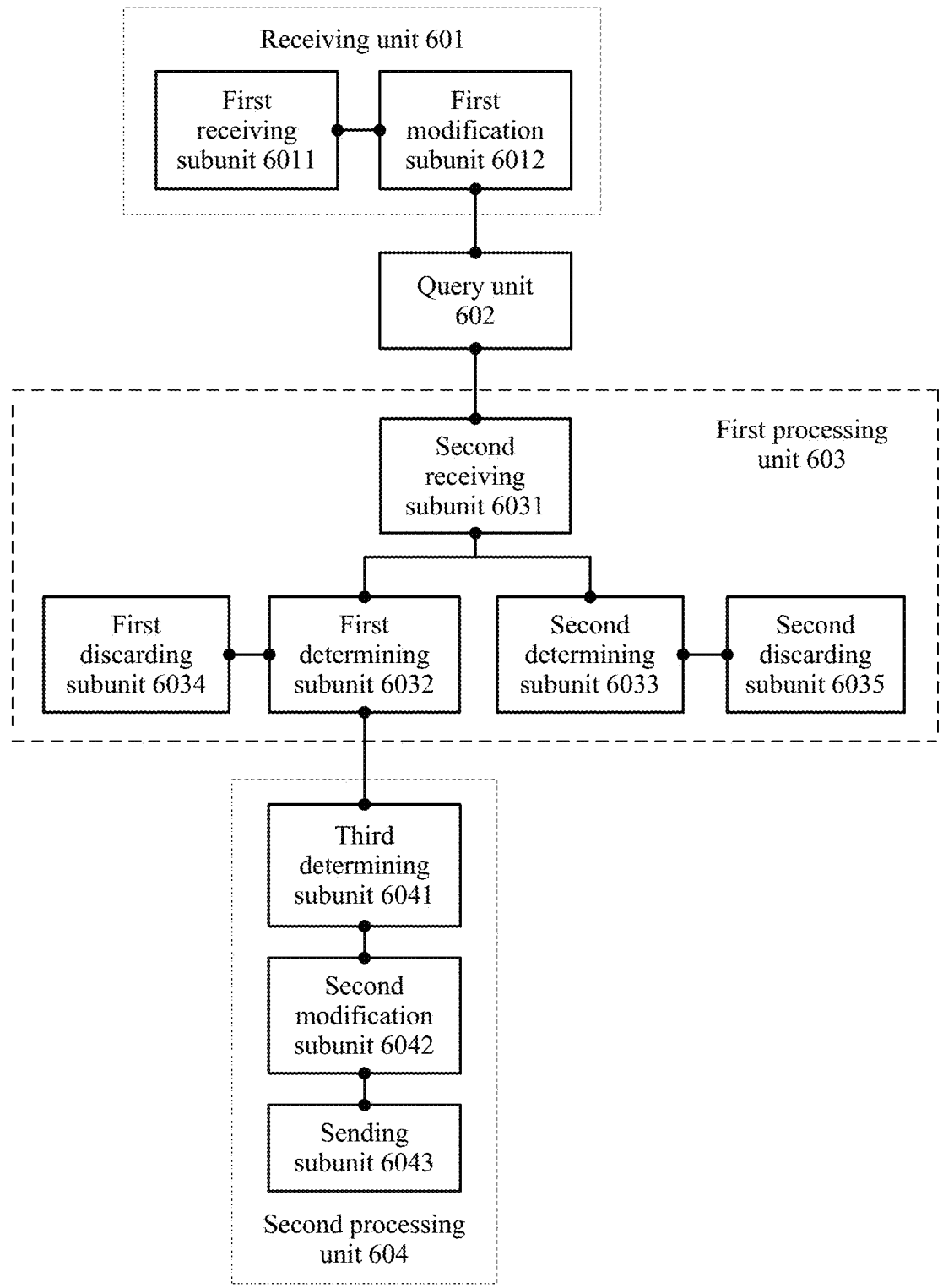
FIG. 6 is a schematic diagram of an embodiment of a second media server according to an embodiment of this application.

Referring to FIG. 6, in the embodiments of this application, an embodiment of a second media server includes: a receiving unit 601 configured to receive a service request sent by a first media server, where the service request is used to obtain target content required by a terminal, the service request includes a destination address, the destination address includes a destination IP address and a destination MAC address, and the destination address is an address of the second media server; a query unit 602 configured to query a target IP address in a database based on the service request, where the target IP address is an IP address of a server in which the target content is located; a first processing unit 603 configured to determine the target IP address based on a candidate IP address fed back by the database; and a second processing unit 604 configured to: if the target IP address is the same as an IP address of the second media server, determine that the second media server hits the target content, and send the target content to the terminal.

Optionally, the receiving unit 601 may include: a first receiving subunit 6011 configured to receive the service request sent by the first media server; and a first modification subunit 6012 configured to modify the destination IP address of the service request to the IP address of the second media server.

Optionally, the first processing unit 603 may include: a second receiving subunit 6031 configured to receive at least one candidate IP address fed back by the database; a first determining subunit 6032 configured such that if the at least one candidate IP address includes the IP address of the second media server, the first determining subunit 6032 determines the IP address of the second media server as the target IP address; and a second determining subunit 6033 configured such that if the at least one candidate IP address does not include the IP address of the second media server, the second determining subunit 6033 determines any one of the candidate IP address as the target IP address.

Optionally, the first processing unit 603 may further include a first discarding subunit 6034 configured to discard a candidate IP address that is not determined as the target IP address.

Optionally, a fourth processing unit 508 may further include a second discarding subunit 6035 configured to discard a candidate IP address that is not determined as the target IP address.

Optionally, the second processing unit 604 may further include: a third determining subunit 6041 configured to determine that the second media server hits the target content; a second modification subunit 6042 configured to modify a source IP address of the target content to an IP address of the first media server, where the source IP address is used by the terminal to continue to communicate with the first media server; and a sending subunit 6043 configured to send the modified target content to the terminal.

In this embodiment of this application, the second media server receives the service request sent by the first media server, such that a delay between the terminal and the second media server is reduced, thereby saving server resources, and improving service quality.

Figure 7:
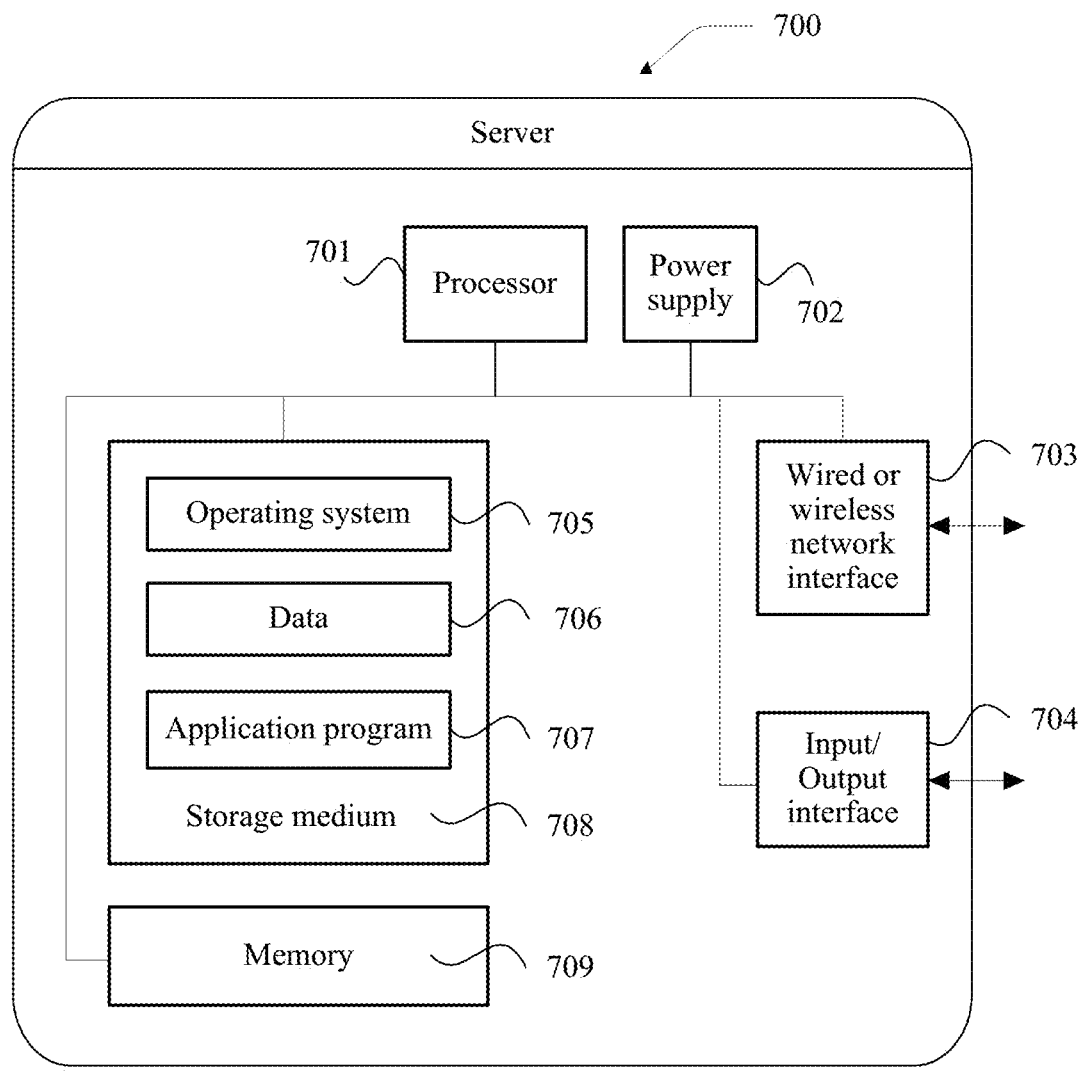
FIG. 7 is a schematic diagram of an embodiment of a server according to an embodiment of this application.

The foregoing describes in detail the first media server and the second media server in the embodiments of this application in FIG. 5 and FIG. 6 respectively from a perspective of a modular functional entity. The following describes in detail a server in an embodiment of this application from a perspective of hardware processing. Referring to FIG. 7, an embodiment of a server in this embodiment of this application is as follows.

FIG. 7 is a schematic structural diagram of a server 700 according to an embodiment of this application. The server 700 may vary considerably depending on different configurations or performance, and may include one or more processors (e.g., Central Processing Units (CPUs)) 701, a memory 709, and one or more storage media 708 (for example, one or more mass storage devices) storing an application program 707 or data 706. The memory 709 and the storage medium 708 may be a transitory or persistent storage. A program stored in the storage medium 708 may include one or more modules (not shown), and each module may include a series of instructions for performing operations on the server. Still further, the processor 701 may be configured to communicate with the storage medium 708, and execute the series of instructions in the storage medium 708 for performing operations on the server 700.

The server 700 may further include one or more power supplies 702, one or more wired or wireless network interfaces 703, one or more input/output interfaces 704, and/or one or more operating systems 705, for example, Windows Server™, Mac OS X™, Unix™, Linux™, or FreeBSD™. It may be understood by persons skilled in the art that, a server structure shown in FIG. 7 does not constitute any limitation on the server, and the server may include more or fewer components than those shown in the figure, or some components are combined, or a different component deployment is used.

The components of the server are described below with reference to FIG. 7.

The memory 709 may be configured to store a software program and a module. The processor 701 runs the software program and the module that are stored in the memory 709, to perform various function applications of the server and data processing. The memory 709 may mainly include a program storage area and a data storage area. The program storage area may store an operating system, an application program required by at least one function (such as a sound play function and an image play function), and the like. The data storage area may store data (such as audio data or an address book) created based on use of the server, and the like. In addition, the memory 709 may include a high speed random access memory, and may further include a non-volatile memory, such as at least one magnetic disk storage device, a flash storage device, or another volatile solid storage device. In this embodiment of this application, a program of a provided transmission rate adjustment mechanism and a received data stream are stored in the memory 709, and the processor 701 invokes the program and the data stream from the memory 709 when needed.

The processor 701 is a control center of the server, and may perform segmented scheduling based on a specified scheduling method. The processor 701 connects all parts of the entire server using various interfaces and lines. By running or executing a software program and/or a module stored in the memory 709 and invoking data stored in the memory 709, the processor 701 performs various functions and data processing of the server, to adjust a transmission rate.

The processor 701 includes a session migration function, and stores and restores a Transmission Control Protocol (TCP) connection in a form of a kernel module. The kernel module is simplified. The kernel module is responsible only for providing an interface or a channel for obtaining and setting socket information. All complex logic, such as migration control, migration information encapsulation and parsing, and information transmission, is implemented in a user mode, to improve flexibility and reduce development and maintenance difficulty.

A session migration function module includes a TCP migration component, and can implement a TCP active connection and migration from one server to another server.

The TCP migration component includes two parts: a user mode LIB library and the kernel module.

The user mode LIB library is responsible for encapsulating an application platform interface (API) and providing the application platform interface for a TCP server for invocation. The user mode LIB library further includes a user mode module handoff svc, configured to provide a handoff message transmission channel and control management.

The kernel module includes a handoff module and a packet control module.

The handoff module is responsible for obtaining socket information from a kernel and setting the socket information.

The packet control module is an auxiliary module, configured to register a netfilter hook netfilter hook, and responsible for forwarding a packet to a specified server or discarding a packet.

Optionally, the processor 701 may include one or more processing units.

In this embodiment of this application, the processor 701 is configured to perform step 302 to step 311 in FIG. 3. Details are not described herein again.

In this embodiment of this application, the processor 701 is configured to perform step 402 to step 409 in FIG. 4. Details are not described herein again.

All or some of the foregoing embodiments may be implemented using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, all or some of the technical solutions disclosed herein may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A session migration-based scheduling method, comprising:
   receiving, by a first media server, a first service request from a terminal, wherein the first service request is to obtain target content required by the terminal, wherein a destination address in the first service request is of the first media server;

determining, by the first media server, a target Internet Protocol (IP) address based on at least one candidate IP address from a database, wherein the target IP address is of a server in which the target content is located;

determining, by the first media server, that the first media server is missing the target content when the target IP address is different from an IP address of the first media server; and sending, according to the first service request, a second service request to a second media server comprising the target content, wherein a source address in the second service request is of the terminal, and wherein a second destination address in the second service request is of the second media server.

2. The session migration-based scheduling method of claim 1, wherein determining, by the first media server, the target IP address based on the at least one candidate IP address from the database comprises:

receiving, by the first media server, the at least one candidate IP address from the database;

determining, by the first media server, the IP address of the first media server as the target IP address when the at least one candidate IP address comprises the IP address of the first media server; and determining, by the first media server, any candidate IP address selected from the at least one candidate IP address as the target IP address when the at least one candidate IP address does not comprise the IP address of the first media server.

3. The session migration-based scheduling method of claim 2, wherein after determining, by the first media server, any one of the candidate IP address as the target IP address, the session migration-based scheduling method further comprises discarding, by the first media server, each candidate IP address that is not the target IP address.

4. The session migration-based scheduling method of claim 1, wherein sending the second service request comprises:

determining, by the first media server, that the first media server is missing the target content;

modifying, by the first media server, the first service request to obtain the second service request by changing a destination Medium Access Control (MAC) address of the first service request to a MAC address of the second media server; and sending, by the first media server, the second service request to the second media server.

5. The session migration-based scheduling method of claim 1, wherein after determining, by the first media server, the target IP address based on the candidate IP address fed back by the database, if the target IP address is the same as the IP address of the first media server, the session migration-based scheduling method further comprises:

determining, by the first media server, that the first media server hits the target content; and sending the target content to the terminal.

6. A session migration-based scheduling method, comprising:

receiving, by a second media server, a service request from a first media server, wherein the service request is to obtain target content required by a terminal, wherein a source address in the service request is of the terminal, and wherein a destination address in the service request is of the second media server;

determining, by the second media server, a target Internet Protocol (IP) address based on at least one candidate IP address from a database, wherein the target IP address is of a server in which the target content is located;

determining, by the second media server, that the second media server contains the target content when the target IP address is the same as an IP address of the second media server; and sending the target content to the terminal.

7. The session migration-based scheduling method of claim 6, wherein receiving, by the second media server, the service request from the first media server comprises:

receiving, by the second media server, the service request from the first media server; and modifying, by the second media server, a destination IP address of the service request to the IP address of the second media server.

8. The session migration-based scheduling method of claim 6, wherein determining, by the second media server, the target IP address based on the candidate IP address fed back by the database comprises:

receiving, by the second media server, the at least one candidate IP address fed back by the database;

determining, by the second media server, the IP address of the second media server as the target IP address when the at least one candidate IP address comprises the IP address of the second media server; and determining, by the second media server, any candidate IP address selected from the at least one candidate IP address as the target IP address when the at least one candidate IP address does not comprise the IP address of the second media server.

9. The session migration-based scheduling method of claim 8, wherein after determining, by the second media server, the IP address of the second media server as the target IP address, the session migration-based scheduling method further comprises discarding, by the second media server, each candidate IP address that is not the target IP address.

10. The session migration-based scheduling method of claim 6, wherein sending the target content to the terminal comprises:

determining, by the second media server, that the second media server contains the target content;

modifying, by the second media server, the target content to obtain modified target content by changing a source IP address of the target content to an IP address of the first media server, wherein the source IP address is for the terminal to continue communicating with the first media server; and sending, by the second media server, the modified target content to the terminal.

11. A first media server comprising:

a memory configured to store an instruction;

a receiver configured to receive a data access request; and at least one processor coupled to the memory and the receiver, the instruction causing the at least one processor to:

receive a first service request from a terminal, wherein the first service request is used to obtain target content required by the terminal, and wherein a destination address in the first service request is of the first media server;

determine a target Internet Protocol (IP) address based on at least one candidate IP address from a database, wherein the target IP address is of a server in which the target content is located;

determine that the first media server is missing the target content when the target IP address is different from an IP address of the first media server; and send a second service request according to the first service request to a second media server, wherein a second Internet Protocol (IP) address of the second media server is the target IP address.

12. The first media server of claim 11, wherein the instruction further causes the at least one processor to:
receive the at least one candidate IP address from the database; and
determine the IP address of the first media server as the target IP address when the at least one candidate IP address comprises the IP address of the first media server; and
determine any candidate IP address selected from the at least one candidate IP address as the target IP address when the at least one candidate IP address does not comprise the IP address of the first media server.

13. The first media server of claim 12, wherein the instruction further causes the at least one processor to discard each candidate IP address that is not the target IP address.

14. The first media server of claim 11, wherein the instruction further causes the at least one processor to:
determine that the first media server is missing the target content;
modify the first service request to obtain the second service request by changing a destination medium access control (MAC) address of the first service request to a MAC address of the second media server; and send the second service request to the second media server.

15. The first media server of claim 11, wherein the instruction further causes the at least one processor to:
determine that the first media server contains the target content when the target IP address is the same as the IP address of the first media server; and
send the target content to the terminal.

16. The first media server of claim 11, further comprising a Transmission Control Protocol (TCP) migration component configured to implement an active TCP connection and a migration between the first media server and the second media server.

17. The first media server of claim 16, wherein the TCP migration component is further configured to implement a second migration between the first media server and the second media server.

18. The session migration-based scheduling method of claim 1, further comprising implementing, by the first media server, an active Transmission Control Protocol (TCP) connection and a migration between the first media server and the second media server.

19. The session migration-based scheduling method of claim 18, further comprising implementing, by the first media server, a second migration between the first media server and the second media server.

20. The first media server of claim 11, wherein the instruction further causes the at least one processor to determine any candidate IP address in the at least one candidate IP address as the target IP address when the at least one candidate IP address does not comprise the IP address of the first media server.

* * * * *